United States Patent [19]

Quednau

[11] Patent Number: 5,425,900

[45] Date of Patent: * Jun. 20, 1995

[54] DISPERSING AGENTS, THEIR USE AND SOLIDS COATED THEREWITH

[75] Inventor: Peter H. Quednau, Hillegom, Netherlands

[73] Assignee: EFKA-Chemicals B.V., Netherlands

[*] Notice: The portion of the term of this patent subsequent to Mar. 21, 2012 has been disclaimed.

[21] Appl. No.: 904,519

[22] Filed: Jun. 25, 1992

Related U.S. Application Data

[63] Continuation-in-part of Ser. No. 634,401, Dec. 27, 1990.

[30] Foreign Application Priority Data

Jun. 26, 1991 [EP] European Pat. Off. ........ 91201650.8

[51] Int. Cl.$^6$ .................... C08G 18/30; C08G 18/72
[52] U.S. Cl. .................... 252/356; 252/351; 252/357; 528/49; 528/83
[58] Field of Search .......... 252/351, 356, 357; 428/52; 528/28, 49, 69, 83

[56] References Cited

U.S. PATENT DOCUMENTS

| | | | |
|---|---|---|---|
| 3,684,771 | 8/1972 | Braun | 528/48 X |
| 3,817,944 | 6/1974 | Jones | 560/158 X |
| 4,032,698 | 6/1977 | Ashe | 526/14 OR |
| 4,070,388 | 1/1978 | Jones | 560/158 X |
| 4,529,744 | 7/1985 | Wood | 252/357 X |
| 4,647,647 | 3/1987 | Haubennestel et al. | 528/83 OR |
| 4,785,796 | 1/1989 | Haubennestel et al. | 528/49 X |
| 4,868,277 | 9/1989 | Chen | 528/272 OR |
| 4,929,705 | 5/1990 | Mazanek et al. | 528/49 OR |
| 4,933,417 | 6/1990 | Yamamoto et al. | 252/351 X |
| 4,942,213 | 7/1990 | Haubennestel et al. | 528/49 X |

FOREIGN PATENT DOCUMENTS

| | | |
|---|---|---|
| 0018099 | 10/1980 | European Pat. Off. . |
| 0270126 | 6/1988 | European Pat. Off. . |
| 0311157 | 4/1989 | European Pat. Off. . |
| 0335197 | 10/1989 | European Pat. Off. . |
| 0318999 | 8/1990 | European Pat. Off. . |
| 0438836 | 7/1991 | European Pat. Off. . |
| 0154678 | 9/2985 | European Pat. Off. . |
| WO10148 | 12/1988 | Japan . |

*Primary Examiner*—Gary Geist
*Assistant Examiner*—Daniel S. Metzimaier
*Attorney, Agent, or Firm*—Cooper & Dunham

[57] ABSTRACT

The present invention relates to dispersing agents or their salts, comprising

A the reaction product of one or more polyisocyanates having an average functionality of from 2.0 to 5, with B at least a monohydroxyl compound, C at least a dicarboxylic acid compound and D a compound containing at least one basic ring nitrogen and an isocyanate-reactive group, in which of the isocyanate groups about 30–70% are reacted with B and C together and about 30–70% with D.

15 Claims, No Drawings

DISPERSING AGENTS, THEIR USE AND SOLIDS COATED THEREWITH

This application is a continuation-in-part of application Ser. No. 634,401, filed Dec. 27, 1990.

The present invention relates to dispersing agents or their salts, on the basis of a compound having at least one ring nitrogen-containing basic group, and the preparation of such compounds.

The invention further relates to the use of the dispersing agents and pulverulent or fibrous solids to be incorporated in liquid systems, which solids are coated with such dispersing agents.

Powerful mechanical forces are required for introducing solids into liquid media. This depends to a large extent on the ease with which the solid can be wetted by the surrounding medium and on the affinity to this medium. To reduce these dispersing forces, it is customary to employ dispersing agents which facilitate incorporation. These are in most cases surface-active substances, also known as tensides, which have an anion-active or cation-active and nonionic structure. These substances are added in relatively small quantities, either by direct application to the solid or by introduction into the dispersing medium. The effort required for dispersion is substantially reduced by such a tenside.

It is also known that these solids tend to reagglomerate after the dispersion process, thus vitiating the effort previously expended for dispersion and leading to serious problems. This phenomenon is explained by London/van der Waal's forces by which the solids attract each other. To overcome these forces of attraction, it is necessary to apply adsorption layers on the solids. This is achieved by using such tensides.

During and after dispersion, however, an interaction between the solid particle and the surrounding medium takes place and desoration of the tenside occurs, accompanied by its replacement by the surrounding medium, which is present at a higher concentration. This surrounding medium, however, is in most cases not capable of building up such stable adsorption layers, and the whole system breaks down. This manifests itself by a rise in viscosity in liquid systems, loss of gloss and shift in colour tone in lacquers and coatings, insufficient development of colour power in pigmented plastics, and decrease of mechanical strength in reinforced plastics.

European patent application 154,678 discloses a dispersing agent comprising the reaction product of a polyisocyanate having a valence of from 2.5 to 6 with a monohydroxyl compound, a difunctional component and a compound containing a basic ring nitrogen.

Due to the nature of the compounds and the reactions connected therewith, it is essential for the product to be manufactured by a multistage method. With regard to the production efficiency this is not desirable. Moreover, the problem occurs that both the intermediate and the end product are not very stable and tend to gelatinizationo More in particular, it may be noted that it is necessary according to the known method to use a multistage process wherein after stage 1, in which the polyisocyanate must first be reacted with the monomer compounds, a difunctional compound cannot be used until in stage 2. If this uneconomical process is not used and the components from stages 1 and 2 are therefore reacted from the beginning, complications will occur in process stage 3 to the extent of a substantial formation of gel particles and a gelatinization of the entire mass. The intermediate resulting from reaction stages 1 and 2, which is reacted in stage 3 with compounds of formula III to obtain a ready-for-delivery product, only has a very limited shelf life (about 24 h) and is therefore not suitable for supply as a basis for further addition reactions.

The products manufactured by the process described show a marked tendency towards gelatinization in the third reaction stage so that these reactions can only be effected in highly diluted solutions, resulting in end products which only have a relatively low solid content. The increase in solid by subsequent vacuum distillation is not possible in view of the marked tendency of the product towards coagulation.

The known dispersing agents further have a compatibility, a solubility and a dispersing activity which are not very good. It is an object of the present invention to provide dispersing agents which, as compared with the known dispersing agents, have improved properties, in particular improved compatibility with binding agents, improved solubility and improved dispersing activity.

It is further an object of the present invention to provide dispersing agents which do not have the above disadvantages with regard to their preparation or to a substantially less extent, and which particularly result in dispersions of solids which do not tend, or only to a minor degree, to reagglomerate after the dispersion process.

It has now surprisingly been found that this problem my be solved by means of the dispersing agents defined below. The invention thus relates to dispersing agents or their salts comprising A the reaction product of one or more polyisocyanates having an average functionality of 2.0 to 5, with
B at least a monohydroxyl compound,
C at least a dicarboxylic acid compound and
D a compound containing at least one basic ring nitrogen and an isocyanate-reactive group, in which of the isocyanate groups about 30–70% are reacted with B and C together and about 30–70% with D.

It has now surprisingly been found that the dispersing agents according to the invention show a better compatibility with, e.g., alkyd resins and oil-free polyester resins, a better solubility and a better dispersing activity of different pigments that are hard to stabilize.

The above advantages are very important in using these binding agents. In consequence thereof, the binding agents can be better used for the dispersion of pigments in binding agents. More in particular, the better solubility offers the possibility of using the dispersing agents in high-solids lacquers because it is advantageous in such systems to use fewer solvents.

When dicarboxylic acids are used instead of the known di-and trimeric hydroxyl compounds, the following advantages can be obtained in the preparation of the dispersing agents: The laborious and uneconomical 2-stage process for preparing the intermediate described in European patent application 154,678 can be carried out in one stage when using dicarboxylic acids without the occurrence of gelatinization with the reaction in the third stage.

The initial products manufactured with dicarboxylic acids have a substantially improved shelf life (several weeks) so that the most different end products can be manufactured from an intermediate, also after a prolonged intermediate storage.

In view of the low tendency towards gelatinization in the third reaction stage, it is possible to manufacture end products having an increased solid content, which is advantageous in the manufacture of lacquers having a high solid content.

According to the invention a polyisocyanate having a functionality of from 2,0 to 5, preferably about 4, is used in the dispersing agents. Suitable polyisocyanates are those which may be obtained, e.g., by the addition of diisocyanates to polyols, trade product: Desmodur L (TM),

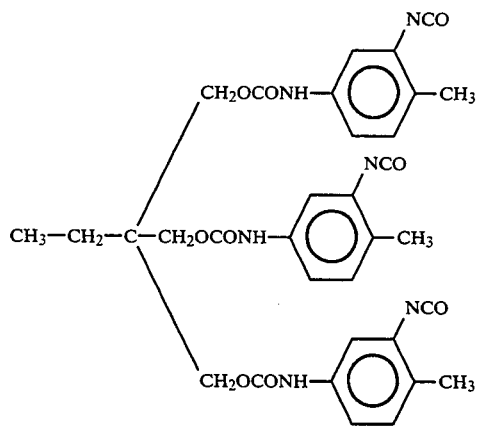

or which may be obtained from diisocyanates by the biuret reaction, trade product: Desmodur N (TM), or the polyisocyanates obtainable by the cyclization of diisocyanates and having an isocyanurate basic structure,

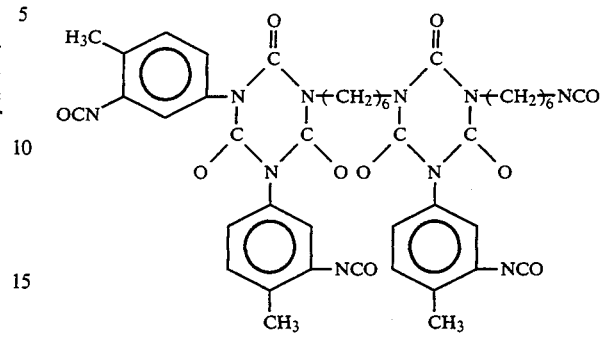

trade product: Desmodur HL (registered trade mark),

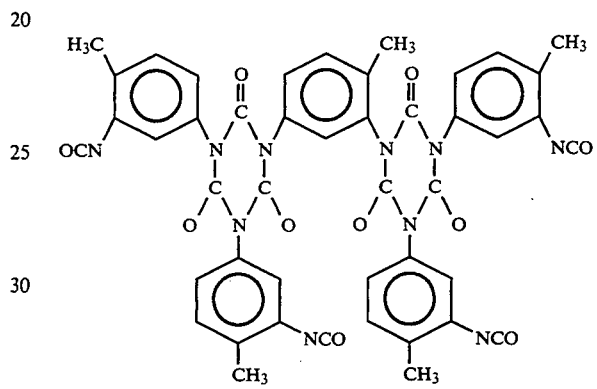

trade product: Desmodur IL (registered trade mark),

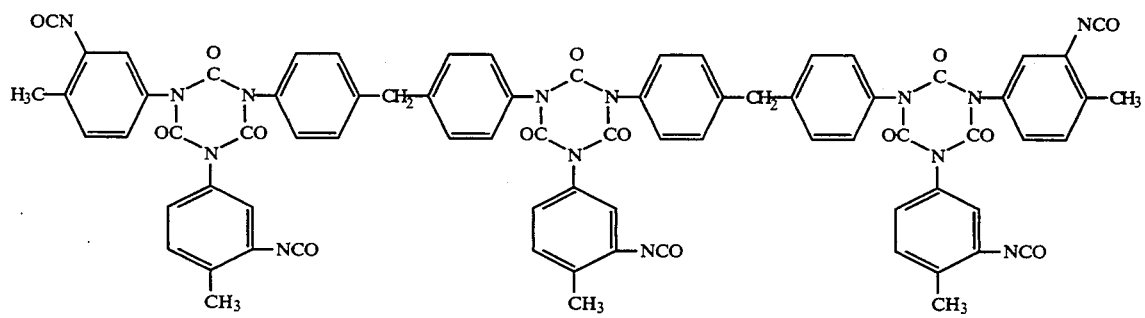

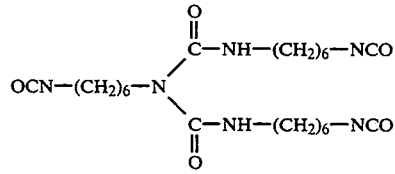

trade product: Polurene KC (registered trade mark),

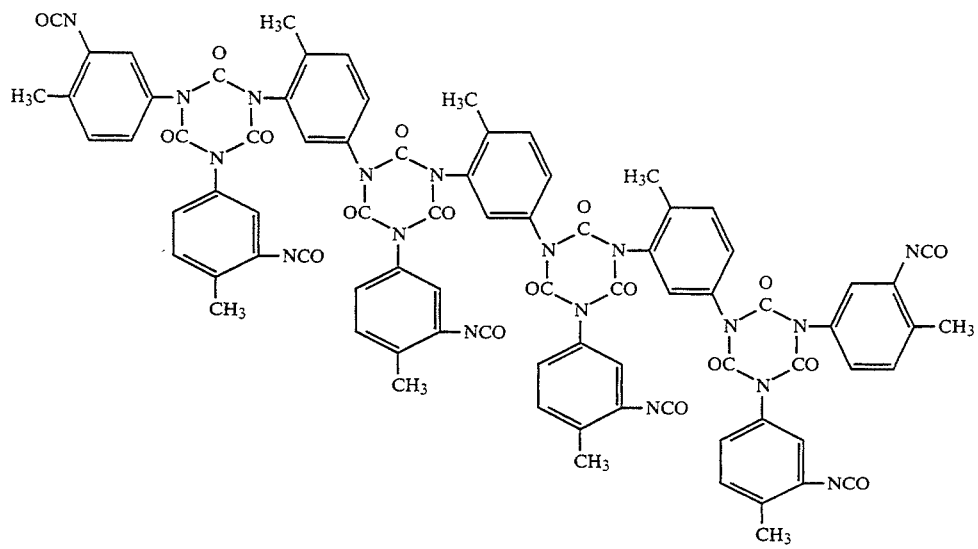

trade product: Polurene HR (registered trade mark),

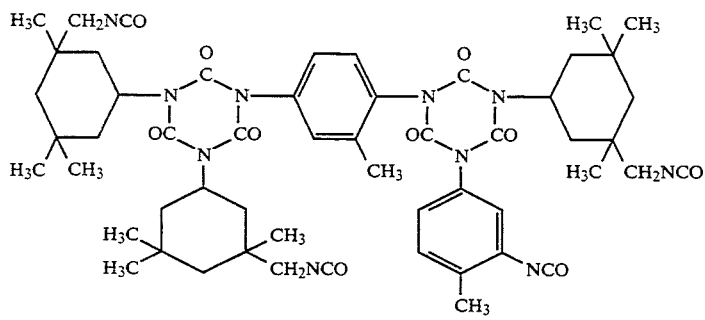

toluylene diisocyanate-isophorone diisocyanate isocyanurate, or

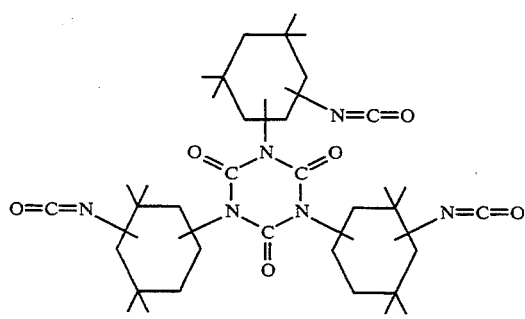

trimeric isophorone diisocyanate (isocyanurate T1890 of Chemische Werke Hüls).

As already mentioned above, the relevant compounds are trade products which frequently do not have the above chemical formulae in their pure form but are mixtures of certain compounds of a similar structure. By average functionality is meant that with regard to the isocyanate groups the trade products have the given functionality of from 2.0 to 5, preferably about 4.

The hydroxyl compounds used are anyhow at least a monohydroxyl compound with an aliphatic and/or cycloaliphatic hydrocarbon which may or may not be substituted with aryl and/or halogen groups, or may contain one or more ether and/or ester groups. Preferably, the monohydroxyl compound has a molecular weight of at least 500 and more in particular of from 750 to 3500. An optimum dispersing activity is obtained with these molecular weights. It is also possible to incorporate one or more substituents in the monohydroxyl compound which increases the compatibility with alkyd resins.

It may be important that in addition to the hydroxyl group the relevant monohydroxyl compound has no substituents reactive with isocyanates under the conditions of preparation of the dispersing agent according to the invention.

The monohydroxyl compounds used may be aliphatic, cycloaliphatic and/or araliphatic compounds. Mixtures of such compounds may also be used. Straight chained and branched aliphatic or araliphatic compounds may be used. They may be saturated or unsaturated. Saturated compounds are preferred. The hydrogen atoms may be partly replaced by halogens, preferably by fluorine and/or chlorine. When such substituted compounds are used, they are preferably aliphatic monoalcohols. Products are commercially available and the carbon atoms close to the hydroxyl group, as is well known to those skilled in the art, generally have no halogen atoms. Examples of specially fluorinated alcohols include heptadecafluorodecanol or $C_6F_{13}CH_2CH_2OH$. The commercially available corresponding products are frequently not uniform but mixtures of different fluorinated compounds as obtained from technical synthesis.

The monohydroxyl compounds used may also be those which contain at least one —O— and/or COO— group. They are therefore polyethers, polyesters or mixed polyether-polyesters. Examples of polyesters include those which may be obtained by the polymerization of a lactone such as propiolactone, valerolactone, caprolactone or substituted derivatives thereof, using a monohydroxyl starting component. The starting components used are monoalcohols, suitably with 4 to 30, preferably 4 to 14 carbon atoms, such as n-butanol, relatively long-chained, saturated and unsaturated alcohols such as propargyl alcohol, oleyl alcohol, linoloyl alcohol, oxo alcohols, cyclohexanol, phenyl ethanol, neopentyl alcohol, but also fluorinated alcohols of the kind mentioned above. Alcohols of the type described above and substituted and unsubstituted alcohols may also be converted into polyoxyalkylene monoalkyl-, aryl-, aralkyl- and cycloalkyl ethers by known methods of alkoxylation with ethylene oxide and/or propylene oxide, and these monohydroxypolyethers may be used in the manner prescribed as starting components for lactone polymerisation. Mixtures of the above-mentioned compounds may be used in all cases. These polyesters suitably have a molecular weight within the range of from about 300 to 8000, preferably 500 to 5000.

There may also be used monohydroxypolyethers obtained by the alkoxylation of alkanols, cycloalkanols and phenols. These polyethers suitably have a molecular weight within the range of from about 350 to 1500.

Suitable dicarboxylic acid compounds may be obtained by the reaction of a diol with a dicarboxylic acid or an anhydride. It is possible to start from a diol of higher molecular weight such as a polyethylene glycol and to react it with a single dicarboxylic acid or a dicarboxylic anhydride. It is also possible to react a dicarboxylic acid of high molecular weight with a diol of low molecular weight. Finally, it is also possible to react almost stoichiometric quantities of diol of low molecular weight and dicarboxylic acid of low molecular weight with each other under such conditions as to form as much dicarboxylic acid as possible and anyhow no or substantially no dihydroxy- or monohydroxy- monocarboxylic acid compound. Preferred is the use of the reaction product of dicarboxylic acid of low molecular weight with a diol of higher molecular weight such as polyethylene glycol.

Preferably, the dicarboxylic acid compound used is a hydrocarbon compound with at least eight carbon atoms contained between the carboxylic acid groups. If desired, this carbon chain may be interrupted by amide, ether, ester, S, $SO_2$ and/or urethane groups. To improve the compatibility of the dispersing agent with different materials, it is generally preferred that the molecular weight of the dicarboxylic acid compound is at least 500, more in particular of from 750 to 4000.

The ratio of the quantities of hydroxyl groups contained in the monohydroxyl compound and the quantities of carboxylic acid groups contained in the dicarboxylic acid compound may vary within relatively broad limits, depending on their use. Preferably, the dicarboxylic acid compound is present in a deficiency with respect to the monohydroxyl compound. The ratio of the number of hydroxyl groups originating from both types of compounds varies from 1: 2 to 5: 1. Preferably, this ratio ranges from 4:1 to 5:2.

An important component in the dispersing agent according to the invention is a compound containing a basic ring nitrogen. Suitable compounds are: N,N-diethyl-1,4-butanediamine, 1-(2-aminoethyl)-piperazine, 2-(1-pyrrolidyl)ethylamine, 4-amino-2-methoxy-pyrimidine, 2-dimethylaminoethanol, 1-(2-hydroxyethyl)-piperazine, 4-(2-hydroxyethyl)-morpholine, 2-mercaptopyrimidine, 2-mercaptobenzimidazole. Particularly preferred are N,N-dimethyl-1,3-propanediamine, 4-(2-aminoethyl)-pyridine, 2-amino-6-methoxybenzothiazole, 4-(aminoethyl)-pyridine, N,N-diallylmelamine, 3-amino-1,2,4-triazole, 1-(3-aminopropyl)-imidazole, 4-(2-hydroxyethyl)-pyridine, 1-(2-hydroxyethyl)-imidazole, 3-mercapto-1,2,4-triazole.

Characteristic of these compounds is that per molecule they contain at least one Zerewitinoff hydrogen atom, which preferably reacts with the isocyanate groups, and that they in addition contain a basic group which contains nitrogen and which is not capable of forming urea with isocyanate groups. These basic groups are also characterised according to the state of the art by their pKa-value (compare U.S. Pat. Nos. 3,817,944; 4,032,698 and 4,070,388). Compounds with basic groups having a pKa-value of from 2 to 14 are preferred, especially those with pKa-values of from 5 to 14 and most especially those with pKa-values of from 5 to 12. The pKa-value can be obtained from tables. The limiting values given above refer to the measurement of the pKa-value at 25° C. at an 0.01 molar concentration in water. These basic groups also impart a basicity to the addition compounds according to the invention, as is also known in this field of the art (compare the above-mentioned U.S. patent specifications). Due to these basic groups, the addition compounds are capable of salt formation. According to the invention, they may also be used in the form of such salts as dispersing agents.

These salts are obtained from the resulting reaction product by neutralisation with organic or inorganic acids or by quaternisation. Salts with organic monocarboxylic acids are preferred.

It is to be noted that it may also be possible to incorporate a minor quantity of a dihydroxyl compound in the dispersing agent according to the invention. The quantity thereof is, however, always such that only a fraction, i.e. less than 5%, preferably less than 2.5% of the isocyanate groups is reacted therewith. Preferably, however, no dihydroxyl compound is present.

The reaction of isocyanate groups takes place by applying known methods. In general, it is preferred to carry out the reaction in such a manner that in a first stage the polyisocyanate is reacted with a mixture of a monohydroxyl compound and a dicarboxylic acid compound. This reaction generally occurs in a suitable solvent (e.g. hydrocarbons such as xylenes, ethers such as dioxane, esters such as butyl acetate, and dimethylformamide), in the presence of a catalyst such as dibutyltin dilaurate, iron acetyl acetonate or triethylenediamine. It is essential for the reaction to occur under such conditions that at least one of the carboxylic acid groups of the dicarboxylic acid reacts with the polyisocyanate. This may be obtained by using a suitable catalyst.

It is possible, but not preferred, to first react the polyisocyanate with the monohydroxyl compound and to further react the resulting reaction product with the dicarboxylic acid compound.

After this reaction, in which in general about 40-80% of the isocyanate groups will be reacted, the reaction is carried out with a compound containing a basic ring nitrogen. This will lead to a reaction of about 20-60% of the isocyanate groups. isocyanate groups that may not have reacted are finally deactivated by the reaction with a lower alcohol or a comparable compound. Particularly butanol is suitably used.

The invention will now be illustrated by some examples but is not limited to them.

EXAMPLE OF PREPARATION A 31.92 g caprolactone, 10.40 g HD-Ocenol 45/50 (Henkel & Cie., Düsseldorf) are dispersed under an inert gas. 0.0012 g dibutyltin dilaurate are added and heated to 170° C. with stirring until a solid of 99% is obtained (about 8 h). The product is solid at room temperature and slightly yellowish in colour.

EXAMPLE OF PREPARATION B 125.00 g polyethylene glycol having the average molecular mass of 1000 are molten under an inert gas. 24.50 g maleic anhydride and 16.61 g methoxypropyl acetate are added with stirring and heated to 150° C. The addition reaction is completely terminated as soon as an acid number of 93 mg KOH/g is obtained; duration about 8 h. The resinous product is yellowish-brown in colour and has a solid content of 90%.

EXAMPLE 1

24.21 g of a caprolactone polyester (Example A) and 63.00 g Desmodur IL ® (50% in butyl acetate) are dissolved in 31.29 g n-butyl acetate and 28.81 g methoxypropyl acetate under an inert gas and with stirring. Then 10.63 g dicarboxylic acid (Example of Preparation B) and 0.02 tin octoate are added, and the formulation is heated to 70° C. After a reaction time of 2 h, 50% the NCO groups have reacted. One cools to 50° C. and adds 3.36 g 3-amino-1,2,4-triazole dispersed in 19.05 g N-methylpyrrolidone, and further stirs for 1 h. Then 6.75 g n-butanol are added, and the temperature is maintained at 50° C. for 2 h. The liquid end product is light yellow in colour and has a solid content of 35%.

EXAMPLE 2

36.32 g of a caprolactone polyester (Example A) and 63.00 g Desmodur IL ® (50% in butyl acetate) are dissolved in 46.94 g n-butyl acetate and 43.22 g methoxypropyl acetate under an inert gas and with stirring. Then 15.95 g dicarboxylic acid (Example of Preparation B) and 0.03 tin octoate are added, and the formulation is heated to 70° C. After a reaction time of 2 h, 50% the NCO groups have reacted. One cools to 50° C. and adds 6.49 g 2-amino-4-methylpyridine which are previously dissolved in 25.95 g N-methylpyrrolidone. The temperature is maintained at 50° C. for another h, and 15.44 g n-butanol are added. To complete the reaction, it is continued for another 2 h at 50° C. The end product is light brown in colour and has a solid content of 35%.

EXAMPLE 3

48.43 g of a caprolactone polyester (Example A) and 84.00 g Desmodur IL ® (50% in butyl acetate) are dissolved in 77.62 g n-butyl acetate and 44.94 g methoxypropyl acetate under an inert gas and with stirring. Then 21.26 g dicarboxylic acid (Example of Preparation B) and 0.04 tin octoate are added, and the formulation is heated to 70° C. After a reaction time of 2 h, 50% the NCO groups have reacted. One cools to 50° C. and adds 10.02 g 1-(3-aminopropyl)-imidazole dissolved in 34.18 g N-methylpyrrolidone. After 1 h, 17.09 g n-butanol are added, and the temperature of 50° C. is maintained for another 2 h. The end product is light yellow in colour and has a solid content of 35%.

EXAMPLE 4

60.54 g of a caprolactone polyester (Example A) and 105.00 g Desmodur IL ® (50% in butyl acetate) are dissolved in 78.23 g n-butyl acetate and 472.04 g methoxypropyl acetate under an inert gas and with stirring. Then 26.57 g dicarboxylic acid (Example of Preparation B) and 0.05 tin octoate are added, and the formulation is heated to 70° C. After a reaction time of 2 h, 50% the NCO groups have reacted. One cools to about 50° C. and adds a solution consisting of 18.02 g 2-amino-6-methoxybenzothiazole and 72.06 g N-methylpyrrolidone. After 1 h, 10.30 g n-butanol are added and maintained at 50° C. for another 2 h. The liquid end product is light brown in colour and has a solid content of 35%.

I claim:

1. Dispersing agents or their salts, comprising:
a reaction product obtained by
  I. reacting (A) one or more polyisocyanates having an average functionality of from 2.0 to 5 with (B) at least one monohydroxyl compound with an aliphatic hydrocarbon, monohydroxyl compound with an aliphatic hydrocarbon substituted with one or more aryl or halogen groups, monohydroxyl compound with a cycloaliphatic hydrocarbon, monohydroxyl compound with a cycloaliphatic hydrocarbon substituted with one or more aryl or halogen groups, monohydroxyl polyether, monohydroxyl polyester, or monohydroxyl polyether-polyester, and (C) at least one dicarboxylic acid compound which comprises at least eight carbon atoms between two carboxylic acid groups to form an intermediate, followed by reacting the intermediate with
  II. a compound containing at least one basic ring nitrogen and a group that is capable of reacting with an isocyanate group,
in which about 30–70% of the isocyanate groups are reacted with the monohydroxyl or the dicarboxylic acid and about 30–70% of the isocyanate groups are reacted with the compound containing the at least one basic ring nitrogen and the group capable of reacting with an isocyanate group, wherein the dispersing agents optionally contain a quantity of dihydroxyl compounds, and wherein the quantity of dihydroxyl compounds is such that less than about 5% of the isocyanate groups reacts therewith.

2. Dispersing agents according to claim 1, wherein the monohydroxyl compound includes an aliphatic and-/or cycloaliphatic hydrocarbon which may or may not be substituted with aryl and/or halogen groups, or may contain one or more ether and/or ester groups.

3. Dispersing agents according to claim 1, wherein the monohydroxyl compound has a molecular weight of at least 500.

4. Dispersing agents according to claim 3, wherein the monohydroxyl compound has a molecular weight of from 750 to 3500.

5. Dispersing agents according to claim 1, wherein the dicarboxylic acid compound is a hydrocarbon chain between two carboxylic acid groups, the hydrocarbon chain having at least eight carbon atoms and optionally being interrupted by amide, ether, ester, S, $SO_2$ and/or urethane groups.

6. Dispersing agents according to claim 1, wherein the molecular weight of the dicarboxylic acid compound is at least 500.

7. Dispersing agents according to claim 6, wherein the molecular weigh of the dicarboxylic acid compound is from 750 to 4000.

8. Dispersing agents according to claim 1, wherein the dicarboxylic acid compound is obtained by reaction of a diol with a dicarboxylic acid or an anhydride.

9. Dispersing agents according to claim 1, wherein the dicarboxylic acid compound is present in a deficiency with respect to the monohydroxyl compound.

10. dispersing agents according to claim 1, wherein the ratio of the number of hydroxyl groups of monohydroxyl compound to the number of carboxylic acid groups of dicarboxylic acid compound varies from 1:2 to 5:1.

11. Dispersing agents according to claim 10, wherein the ratio of the number of hydroxyl groups of monohydroxyl compound to the number of carboxylic acid groups of dicarboxylic acid compound varies from 4:1 to 5:2.

12. Dispersing agents according to claim 1, wherein for each molecule the compound containing the at least one basic ring nitrogen and the group capable of reacting with an isocyanate group contains at least one Zerewitinoff hydrogen atom, which preferably reacts with the isocyanate groups, and in addition contains a nitrogen-containing basic group which is not capable of forming urea with isocyanate groups.

13. Dispersing agents according to claim 12, wherein the compound containing at least one basic ring nitrogen and the group capable of reacting with an isocyanate group is selected from the group consisting of 1-(2-aminoethyl)piperazine, 2-(1-pyrrolidyl)-ethylamine, 4-amino-2-methoxy-pyrimidine, 1-(2-hydroxyethyl)-piperazine, 4-(2-hydroxyethyl)-morpholine, 2-mercaptopyrimidine, 2-mercaptobenzimidazole, 4-(2-aminoethyl)-pyridine, 2-amino-6-methoxybenzothiazole,4-(aminoethyl)-pyridine, N,N-diallyl-melamine, 3-amino-1,2,4-triazole, 1-(3-aminopropyl)-imidazole, 4-(2-hydroxyethyl)-pyridine, 1(2-hydroxyethyl)-imidazole and 3-mercapto-1,2,4-triazole.

14. Dispersing agents according to claim 1, wherein the quantity of dihydroxyl compounds is such that less than about 2.5% of the isocyanate groups reacts therewith.

15. Dispersing agents according to claim 14 wherein no dihydroxyl compound is present therein.

* * * * *